United States Patent [19]
Honma

[11] Patent Number: 6,111,835
[45] Date of Patent: Aug. 29, 2000

[54] PRML DECODER FOR PROCESSING DIFFERENT CHANNEL CODES WITH REDUCED HARDWARE

[75] Inventor: Hiromi Honma, Tokyo, Japan

[73] Assignee: NEC Corporation, Tokyo, Japan

[21] Appl. No.: 09/121,834

[22] Filed: Jul. 24, 1998

[30] Foreign Application Priority Data

Jul. 24, 1997 [JP] Japan .................................. 9-198856

[51] Int. Cl.[7] ....................................................... G11B 7/00
[52] U.S. Cl. .............................................................. 369/59
[58] Field of Search .................................. 369/47, 49, 54, 369/58, 59, 124.1

[56] References Cited

U.S. PATENT DOCUMENTS 5,604,724  2/1997  Shiokawa ................................... 369/59

Primary Examiner—Nabil Hindi
Attorney, Agent, or Firm—NEC Corporation

[57] ABSTRACT

In a PRML decoder, a branch metric calculator receives an input bit sequence having a multi-level multi-state characteristic precoded in a particular channel code and produces a set of branch metrics corresponding in number to amplitude levels which the input bit sequence assumes. ACS circuitry is formed of add/compare/select (ACS) circuits, adders and unit delay elements connected respectively to the ACS circuits and the adders. The ACS circuitry is arranged to respond to a channel code indication signal representing a type of the particular channel code such that, when the particular channel code is of a first tape, the ACS circuits and the associated unit delay elements combine to produce a first path select signal and most recent path metrics from the branch metrics and previous path metrics, and when the particular channel code is of a second type, the ACS circuits, the adders and the associated unit delay elements combine to produce a second path select signal and most recent path metrics from the branch metrics and previous path metrics. A path memory is responsive to the first and second path select signals and the channel code indication signal for producing an output bit sequence.

22 Claims, 8 Drawing Sheets

PATH MEMORY 30

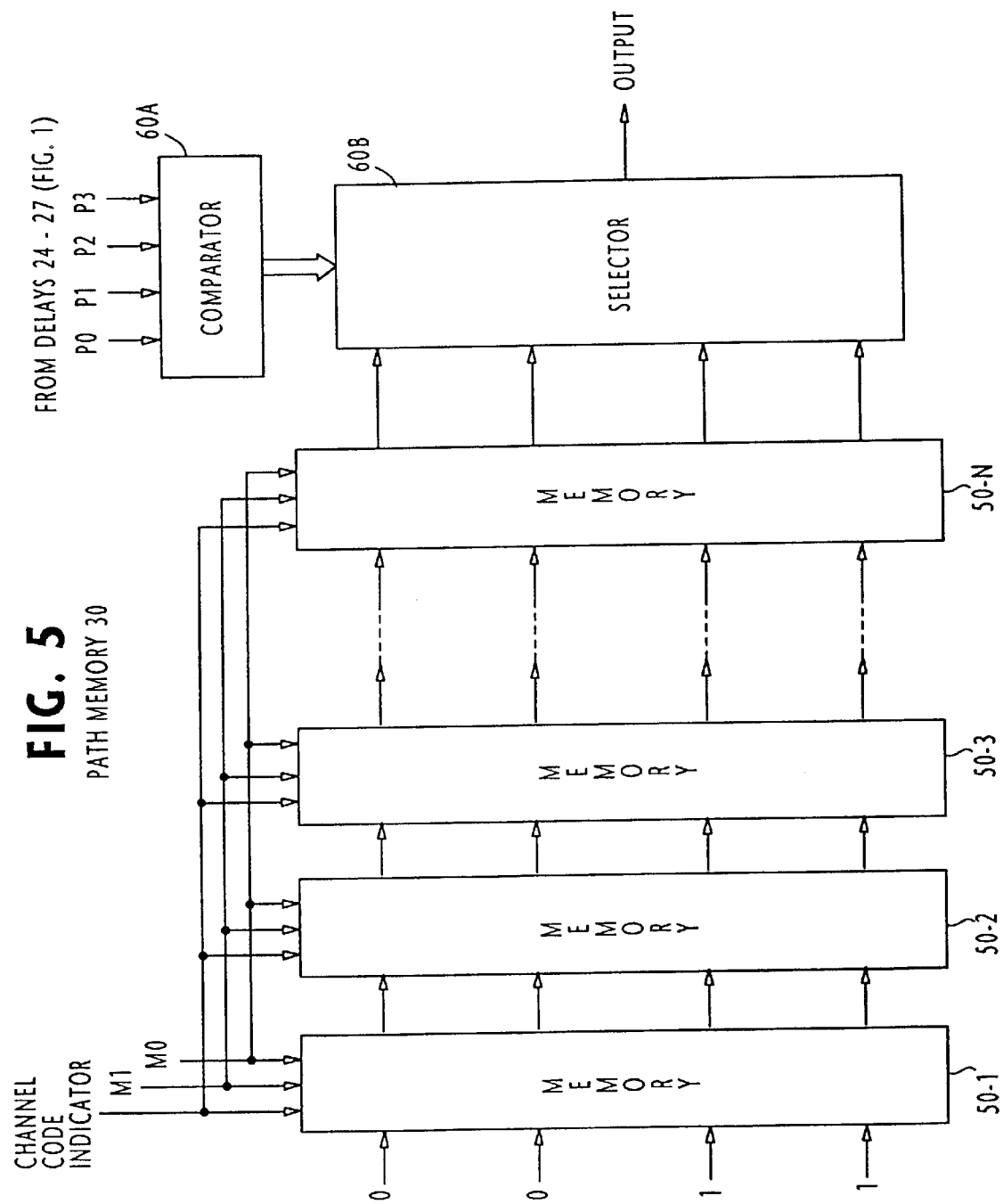

PATH MEMORY 87

OUTPUT/INPUT

OUTPUT/INPUT

PRML DECODER FOR PROCESSING DIFFERENT CHANNEL CODES WITH REDUCED HARDWARE

BACKGROUND OF THE INVENTION

1. Field of the Invention

The present invention relates generally to partial response maximum likelihood (PRML) detection of coded signals using the Viterbi algorithm. The present invention is particularly useful for recovering precoded signals recorded on a high-density storage medium or transmitted on a communication link

2. Description of the Related Art

Partial response maximum likelihood detection technique is currently receiving attentions due to its powerful error correcting capability on high density signals. A number of different high-density coding methods such as (1, 7) run-length limited coding and EFM (eight-to-fourteen modulation) coding have been developed and Viterbi algorithm is used for maximum likelihood sequence detection. However, different coding schemes are currently employed for optical discs although their size and appearance are substantially the same. Since the Viterbi decoder must be designed to specifically meet the coding method employed, more than one Viterbi decoder would be required if optical discs of different coding format were to be used on a single playback system.

More specifically, for processing coded signals with no run length constraint, PRML detection would require a branch metric calculator, ACS (add/compare/select) circuitry and a path memory having a series of many memory stages. The ACS circuit includes two ACS sub-circuits each comprising a pair of adders, a comparator and a selector. A set of branch metrics $(x_i \pm 1)^2$ and $x_i^2$ is produced from an input bit sequence and applied to the adders of each ACS sub-circuit where one of the branch metrics of each ACS sub-circuit are summed with a previous path metric of the other ACS sub-circuit, while the other branch metric of each ACS sub-circuit is summed with a previous path metric of its own ACS sub-circuit. In each ACS sub-circuit, the outputs of the adders are compared with each other and a smaller of the two is determined by the comparator and selected. Each memory stage of the path memory includes two unit delay elements. The outputs of the comparators of both ACS sub-circuits are used as path select signals In each memory stage for determining a maximum likelihood bit sequence that appears on a surviving path of the trellis diagram.

On the other hand, if the (1, 7) run-length limited coding is used, two adders would be additionally provided in the ACS circuitry. Each additional adder produces a path metric by summing the branch metric $x_i^2$ with a previous path metric received from one of the ACS sub-circuits and supplying its output to the other ACS sub-circuit. Each memory stage of the path memory for the (1, 7) run-length limited coding would include additional two unit memories. Thus, a significant amount of hardware would be required if different channel codes were to be processed individually by different PRML decoders.

SUMMARY OF THE INVENTION

It is therefore an object of the present invention to provide a PRML decoder capable of processing different channel codes with a minimum of hardware.

According to a broader aspect, the present invention provides a partial response maximum likelihood decoder comprising a branch metric calculator for receiving an input bit sequence having a multi-level multi-state characteristic precoded in a particular channel code and producing a set of branch metrics corresponding in number to amplitude levels which the input bit sequence assumes. ACS circuitry is formed of a plurality of ACS circuits, a plurality of adders and a plurality of unit delay elements connected respectively to the ACS circuits and the adders. The ACS circuitry is arranged to respond to a channel code indication signal signifying a type of the particular channel code such that, when the particular channel code is of a first type, the ACS circuits and the associated unit delay elements combine to produce a first path indication and most recent path metrics from the branch metrics and previous path metrics, and when the particular channel code is of a second type, the ACS circuits, the adders and the associated unit delay elements combine to produce a second path indication and most recent path metrics from the branch metrics and previous path metrics. A path memory is responsive to the first and second path indications and the channel code indication for producing an output bit sequence.

According to a second aspect, die present invention provides a partial response maximum likelihood decoder comprising a branch metric calculator for receiving an input bit sequence having a multi-level multi-sate characteristic precoded in a particular channel code and producing a set of branch metrics corresponding in number to amplitude levels which the input bit sequence assumes. ACS circuitry is formed of a plurality of ACS circuits, a plurality of adders and a plurality of unit delay elements connected respectively to the ACS circuits and the adders. First selector circuitry is provided for selectively coupling the branch metrics to the ACS circuitry according to a channel code indication indicating a type of the particular channel code and second selector circuitry for selectively feeding path metrics back to the ACS circuitry according to the channel code indication, so that when the particular channel code is of a fist type, the ACS circuits and the associated unit delay elements combine to produce a first path indication and most recent path metrics from the branch metrics and previous path metrics, and when the particular channel code is of a second type, the ACS circuits, the adders and the associated unit delay elements combine to produce a second path indication and most recent path metrics from the branch metrics and previous path metrics. A path memory is responsive to the first and second path indications and the channel code indication for producing an output bit sequence.

According to a third aspect, the present invention provides a partial response maximum likelihood decoder comprising a branch metric calculator for receiving an input bit sequence having a multi-level multi-state characteristic precoded in a particular channel code and producing a set of branch metrics corresponding in number to amplitude levels which the input bit sequence assumes. ACS circuitry is formed of a plurality of ACS circuits, a plurality of adders and a plurality of unit delay elements connected respectively to the ACS circuits and the adders, the ACS circuitry being arranged to respond to a channel code indication indicating a type of the particular channel code such that, when the particular channel code is of a first type, ones of the ACS circuits perform normal ACS functions and remainder ones of the ACS circuits perform add functions, and the normal-functioning ACS circuits, the add-functioning ACS circuits, the adders and the associated unit delay elements combine to produce a first path indication and most recent path metrics from the branch metrics and previous path metrics, and when the particular channel code is of a second type, the ACS circuits, the adders and the associated unit delay elements combine to produce a second path indication and most recent path metrics from the branch metric and previous path metrics. A path memory is responsive to the first and second path indications and the channel code indication for producing an output bit sequence.

BRIEF DESCRIPTION OF THE DRAWINGS

The present invention will be described in further detail with reference to the accompanying drawings, in which:

FIG. 5 is a block diagram of a modified path memory of the first embodiment;

DETAILED DESCRIPTION

Figure 1:
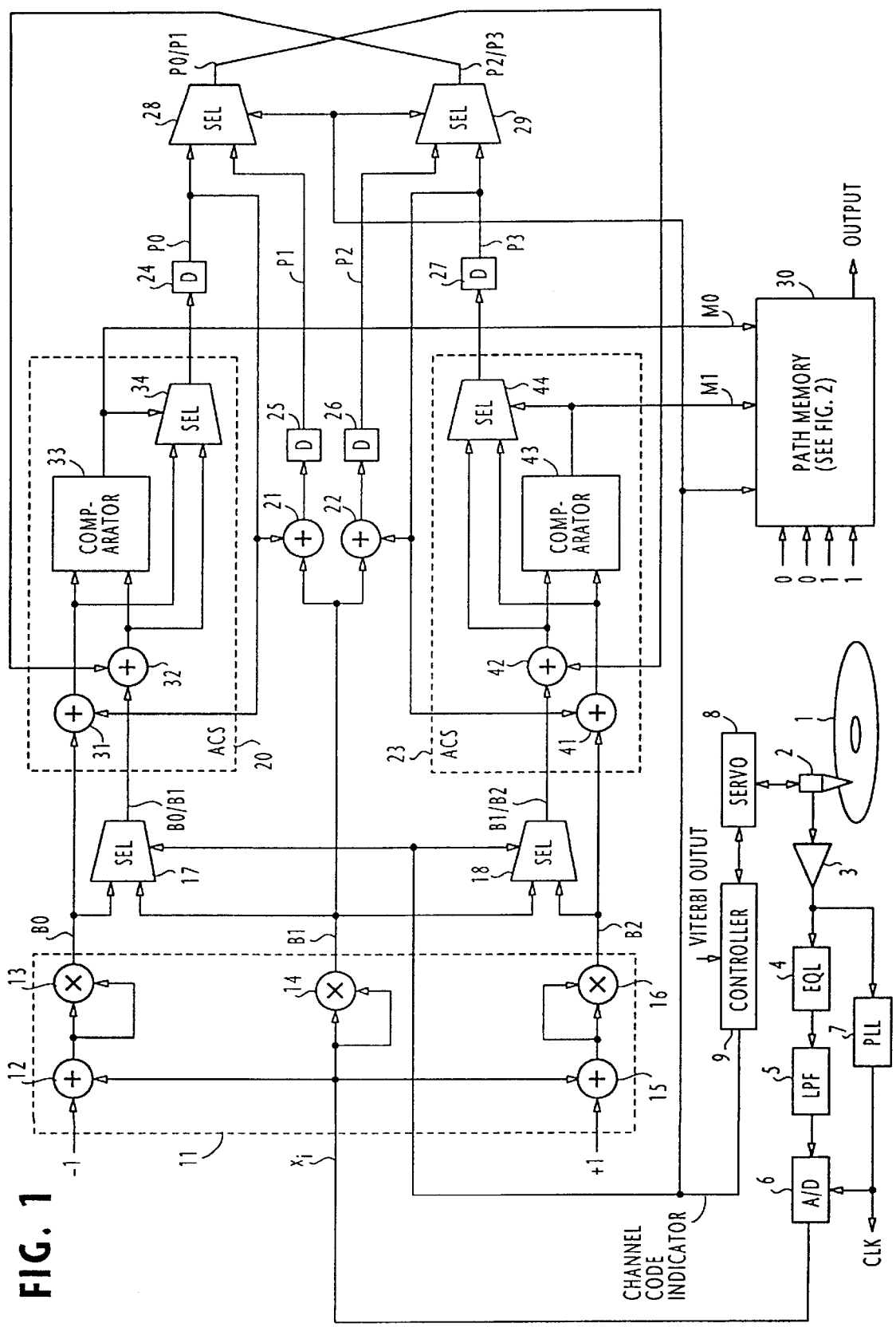
FIG. 1 is a block diagram of a PRML decoder according to a first embodiment of the present invention.
Figures 2, 3A, 3B:
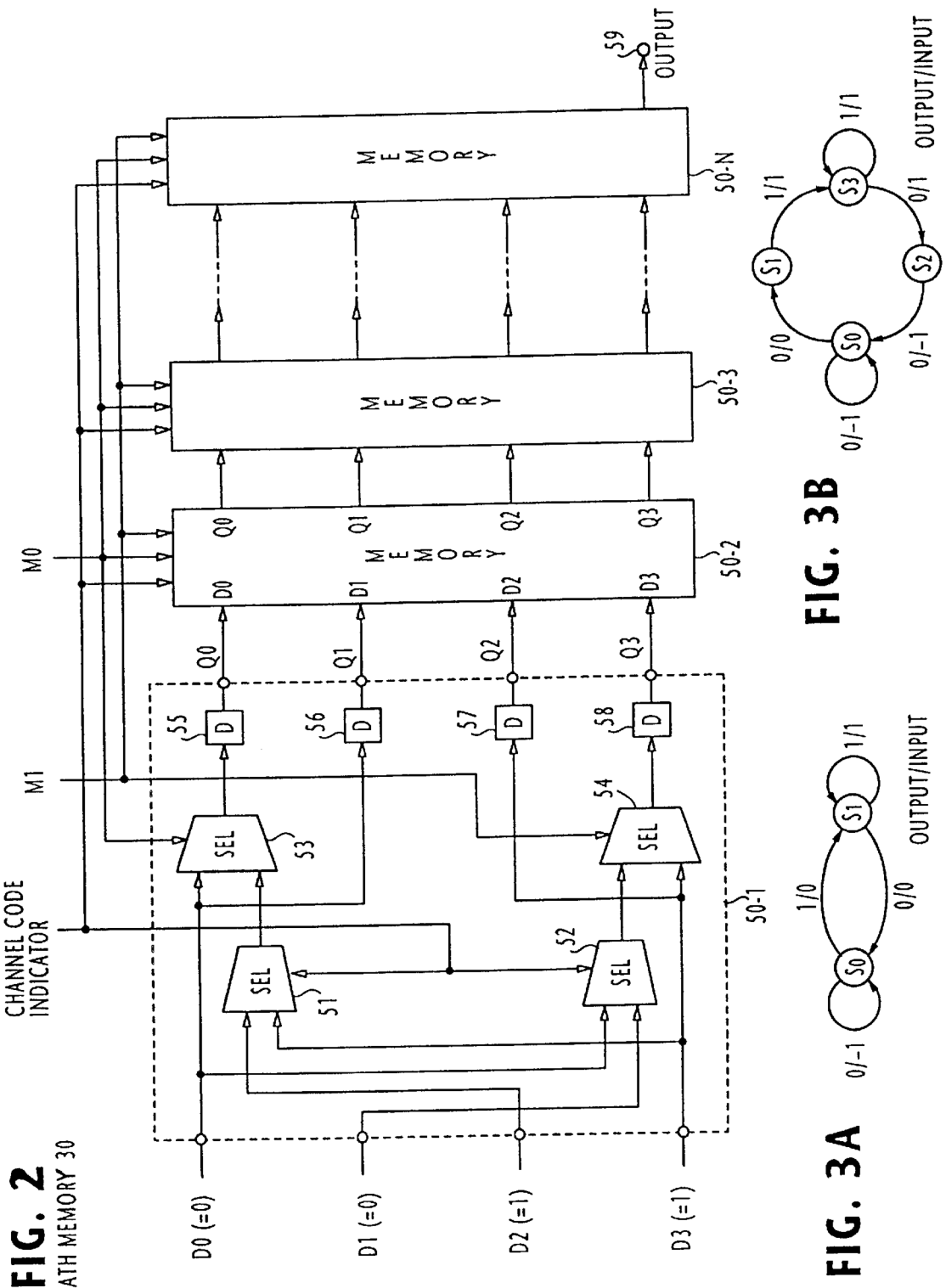
FIG. 2 is a block diagram of a path memory according to the first embodiment of this invention.
FIGS. 3A and 3B are three-level two-state and three-level four-state transition diagrams, respectively, associated with the embodiment of FIG. 1.

Referring to FIGS. 1 and 2, there is shown a playback system for optical recording discs according to one embodiment of the present invention. Optical information was recorded on a spinning optical disc 1 through a precoder, not shown, and intersymbol interference is introduced by a recording system in a controlled manner. The recorded information is detected by a laser pickup head 2 and supplied to a servo-controller 8 where the focusing and track-following control is performed on the position of the head 2. The pickup head 2 is initially positioned on the innermost track to pick up control data. The control data includes a channel code indication signal indicating the type of channel code of the optical information. This control data is supplied from the servocontroller 8 to a controller 9 to detect and hold the channel code indicator. When the pickup head 2 is moved from the innermost track, coded optical information is sensed and amplified by an amplifier 3 and fed to a partial response equalizer 4.

Equalizer 4 is a transversal filter that adaptively corrects the waveform of its input signal so that its output has the characteristic of a PR(1, 1) channel in which a single isolated pulse input is transformed into a waveform having discrete values . . . 0, 0, 1, 1, 0, 0 . . . at decision instants. Due to the introduction of intersymbol interference on the recorded signal, the output of the equalizer has three levels (−1, 0, 1). The PR(1, 1) channel has two states $S_0$ and $S_1$ as indicated by a three-level two-state transition diagram of FIG. 3A when the recorded signal is not run-length limited or four states $S_0$ to $S_3$ as represented by a three-level four-state transition diagram of FIG. 3B when it is run-length limited (d=1), i.e., the minimum length of zeros is one bit. The output of the equalizer 4 is filtered by an anti-aliasing lowpass filter 5 to remove components which would otherwise cause foldover distortion when the filtered signal is sampled. The amplitude of each sample is converted to a digital value in an analog-to-digital converter 6. A phase-locked loop 7 is connected to the output of amplifier 3 to extract clock information which is used by the A/D converter 6 for sampling its input signal.

The output of the A/D converter 6 is represented by a bit sequence $x_i$ (where i represents channel clock) which is applied to a dual mode PRML (partial response maximum likelihood estimation) Viterbi decoder of the present invention which receives a bit sequence from a channel. In the first embodiment of this invention, the channel has a three-level input of either two-state or four-state and produces a binary output as indicated by the state transition diagrams of FIGS. 3A and 3B. The channel code indicator from the controller 9 thus represents the number of such transition states or the number of possible reference levels which the signal assumes. The maximum likelihood sequence estimation of the decoder is a process of making a search, on a real time basis, for a bit sequence $E_i$ which minimizes the path metric $$z_n = \sum_{i=0}^{n} (x_i - E_i)^2$$

using a soft-decision Viterbi algorithm, where $(x_i - E_i)^2$ is called the branch metric in the trellis diagram of the Viterbi algorithm. In the case of two-state transition diagram, the following two path metrics $z_n(S_0)$ and $z_n(S_1)$ are produced for channel states $S_0$ and $S_1$ at a given clock instant "n":

$z_n(S_0) = \min \{z_{n-1}(S_0) + (x_n+1)^2, z_{n-1}(S_1) + x_n^2\}$ $z_n(S_1) = \min \{z_{n-1}(S_1) + (x_n+1)^2, z_{n-1}(S_0) + x_n^2\}$ The decoder has a branch metric calculator 11 where the input sequence $x_i$ is summed in an adder 12 with a binary "−1" and then squared in a multiplier 13 to produce a first branch metric $B0 = (x_i-1)^2$. Concurrently, the input sequence $x_i$ is squared by a multiplier 14 to produce a second branch metric $B1 = x_i^2$. A third branch metric $B2 = (x_i+1)^2$ is produced by summing a binary "+1" to the input sequence in an adder 15 and squaring the sum in a multiplier 16.

The output sequences of the branch metric calculator 11 are applied to a first selector stage which includes a first selector 17 for selecting one of the first and second branch metrics and a second selector 18 for selecting one the second and third branch metrics, these selectors being controlled by the number of states to be assumed by the bit sequence $x_i$ as indicated by the channel code indicator from the controller 9. In the case of two-state channel, the second branch metric $B1 = x_i^2$ is selected by both selectors and in the case of four-state channel, the first branch metric $B0 = (x_i-1)^2$ and the third branch metric $B2 = (x_i+1)^2$ are selected.

The outputs of multiplier 13 and selector 17 are coupled to an ACS (add/compare/select) circuit 20, the output of multiplier 14 being coupled to adders 21 and 22 and the outputs of multiplier 16 and selector 18 being coupled to an ACS circuit 23.

One clock interval is introduced by unit delay circuits 24, 25, 26 and 27 to the outputs of ACS circuit 20, adders 21, 22 and ACS circuit 23, respectively, to produce path metrics P0, P1, P2 and P3.

Adder 21 combines the branch metric B1 with the path metric P0 to produce an updated path metric P1 at the output of delay circuit 25, and the adder 22 combines the branch metric B1 with the path metric P3 to produce an updated path metric P2 at date output of delay circuit 26.

A second selector stage is formed by selectors 28 and 29 which are controlled by the channel code indicator for selecting one of the path metrics P0 and P1 and one of the path metrics P2 and P3. In the case of two-state channel, the path metrics P0 and P3 are selected by selectors 28 and 29, and in the case of four-state channel the path metrics P1 and P2 are selected.

In the ACS circuit 20, the branch metric B0 of multiplier 13 is summed with the path metric P0 of delay circuit 24 in an adder 31 and the branch metric B0/B1 of selector 17 is summed with the path metric P2/P3 of selector 29 in an adder 32. The outputs of adders 31 and 32 are supplied to a comparator 33 and a selector 34. Comparator 33 compares these signals and supplies an output signal to the selector 34, indicating which of the adder outputs has a smaller path metric value. Selector 34 responds to the output of comparator 33 for selecting one of the adder outputs, which appears at the output of the delay circuit 24 as an updated path metric P0 during the next clock interval.

In like manner, in the ACS circuit 23, the branch metric B2 of multiplier 16 is summed with the path metric P3 of delay circuit 27 in an adder 41 and the B1/B2 output of selector 18 is summed with the P0/P1 output of selector 28 in an adder 42. The outputs of adders 41 and 42 are supplied to a comparator 43 and a selector 44. Comparator 43 supplies an output signal to the selector 44, indicating which of the adder outputs has a smaller path metric value. Selector 44 responds to the output of comparator 43 for selecting one of the adder outputs, which appears at the output of the delay circuit 27 as an updated path metric P3 during the next clock interval.

The outputs of comparators 33 and 43 are supplied to a path memory 30 in which they are used as path select signals M0 and M1. In addition, the channel code indicator is also applied to the path memory 30.

As shown in detail in FIG. 2, the path memory 30 comprises memories 50-1 to 50-N of identical construction connected in multiple stages. Memory 50-1 comprises a first pair of adders 51 and 52 which respond to the channel code indicator for selecting discrete values D3 and D1 (which are respectively binary "1" and binary "0" for the first stage memory 50-1) in the case of two-state channel and selecting discrete values D2 and D1 (which are respectively binary "1" and binary "0" for the first stage memory 50-1) in the case of four-state channel. A selector 53 is responsive to the path select signal M0 for selecting one of the D0 input and the output of selector 51, and a selector 54 is responsive to the path select signal M1 for selecting one of the D3 input and the output of selector 52. The outputs selectors 53 and 54 of each memory 50 are respectively coupled through unit delay circuits 55 and 58 to output terminals Q0 and Q3 of the memory and thence to input terminals D0 and D3 of the next stage memory and the D0 and D3 inputs of each memory 50 are respectively coupled through unit delay circuits 56 and 57 to output terminals Q1 and Q2 of the memory and thence to input terminals D1 and D2 of the next stage.

The delay circuits 55 to 58 of each memory stage are clocked so that their contents are propagated from one stage to the next. The path memory 30 selects a surviving path through a trellis diagram as a maximum likelihood bit sequence in accordance with the path select signals M0 and M1 and delivers it through a terminal 59. The output signal of the Viterbi decoder is applied to an external circuit for utilization. This signal is also used by the controller 9 to assist the servocontroller 8 in its track-following operation.

Figure 4A:
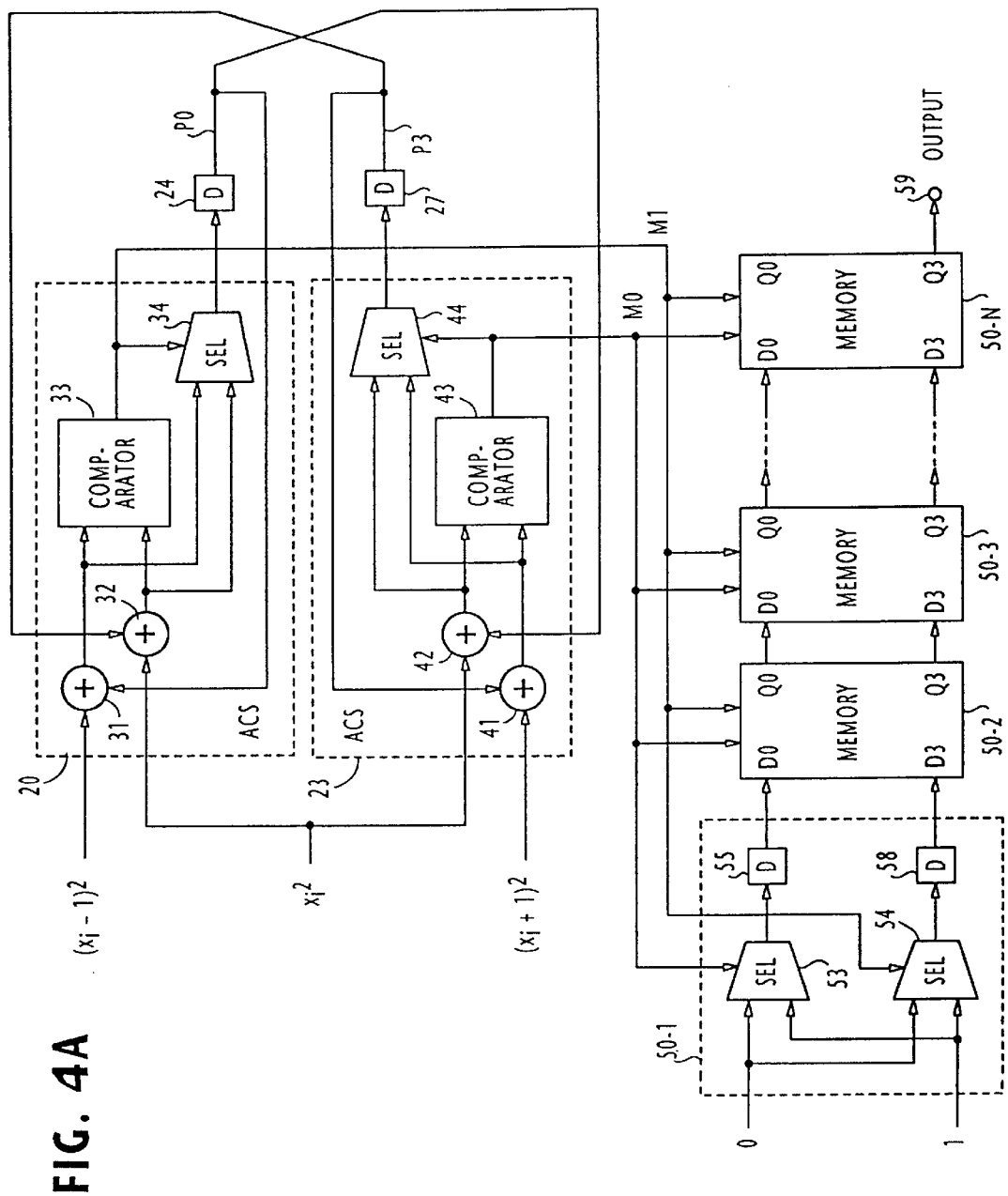
FIG. 4A is a block diagram of the first embodiment when the recording channel has two transition states.
Figure 4B:
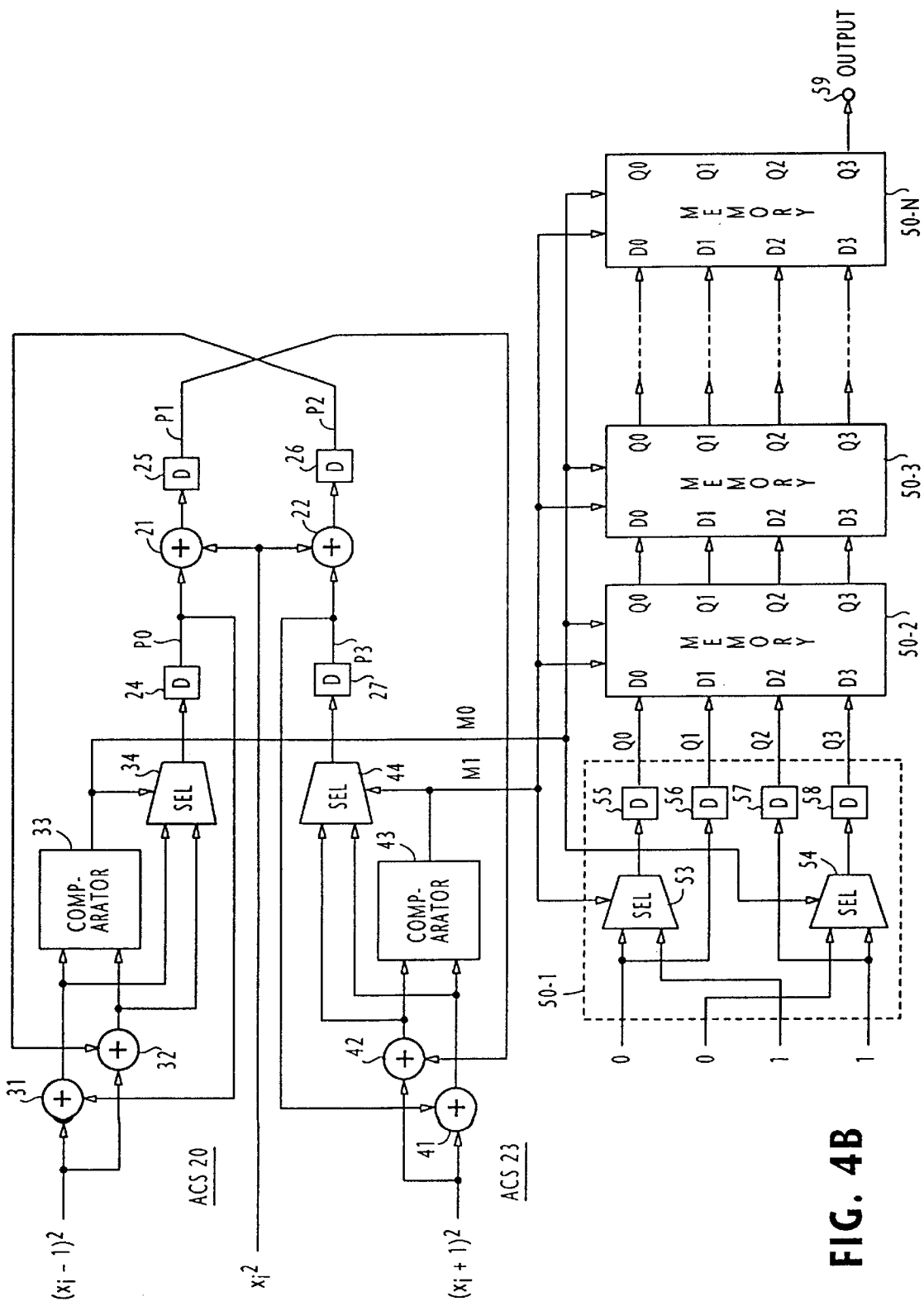
FIG. 4B is a block diagram of the first embodiment when the recording channel has four transition states.

It is seen that when the input bit sequence xi is a three-value two-state signal, the PRML processor shown in FIGS. 1 and 2 is configured into a simplified form as shown in FIG. 4A. During the two-state channel mode, path metrics P0 and P3 are only used in the PRML processor as feedback signals to the adders 31, 32 and adders 42 and 41 and binary levels at the D0 and D3 terminals are only used in the path memory. When the input bit sequence is a three-value four-state signal, the PRML processor shown in FIGS. 1 and 3 is configured into a form as shown in FIG. 4B. in which path metrics P0, P2 are used as feedback signals to the adders 31, 32 and path metrics P1 and P3 are used as feedback signals to the adders 42 and 41 and all binary levels at the D0, D1, D2 and D3 terminals are used in the path memory.

Hardware savings can be achieved by the present invention which is significant in comparison with a PRML decoder which combines separate Viterbi decoders for two-state and four-state channels.

In a preferred embodiment, the path memory 30 is modified as shown in FIG. 5 in which a comparator 60A and a selector 60B are additionally provided. Comparator 60A compares the path metrics P0, P1, P2 and P3 with each other and determines the path metric of minimum value. Selector 60B is connected to all the output terminals of the last-stage memory 50-N to select one of these terminals in accordance with the minimum path metric determined by the comparator 60A This increases the degree of certainty of the surviving path in the trellis diagram of the path memory 30.

The present invention could equally be applied to other coded signals. A second embodiment of the present invention shown in FIGS. 6 and 7 operates in a dual mode for processing signals from a recording disc having either a five-level six-state channel or a seven-level six-state channel.

Figure 8A:
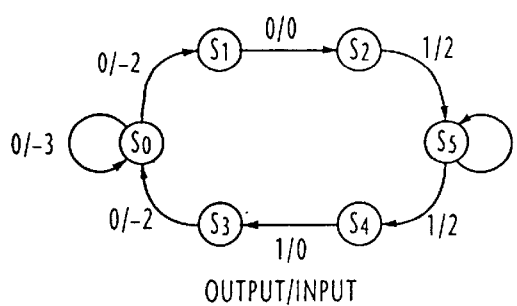
FIGS. 8A and 8B are five-level six-state and seven-level six-state transition diagrams, respectively, associated with the embodiment of FIG. 6.
Figure 8B:
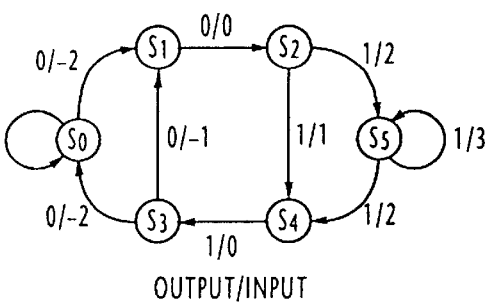

In this embodiment, the amount of intersymbol interference introduced by the recording system is controlled such that the output of the equalizer 4 has the characteristic of a PR(1, 2, 2, 1) channel, in which a single isolated pulse input is transformed into a waveform having discrete values, . . . , 0, 0, 1, 2, 2, 1, 0, 0, . . . , at decision instants. Due to the introduction of intersymbol interference the equalizer 4 produces in output having five levels (−3, −2, 0, 2, 3) with six transition states $S_0$ to $S_5$ as shown in FIG. 8A when the recorded signal is a (1, 7) run-length limited code (d=2), or seven levels (−3, −2, −1, 0, 1, 2, 3) with the same six transition sates as shown in FIG. 8B when it is a run-length limited EFM (eight-to-fourteen modulation, d=1) code.

Figure 6:
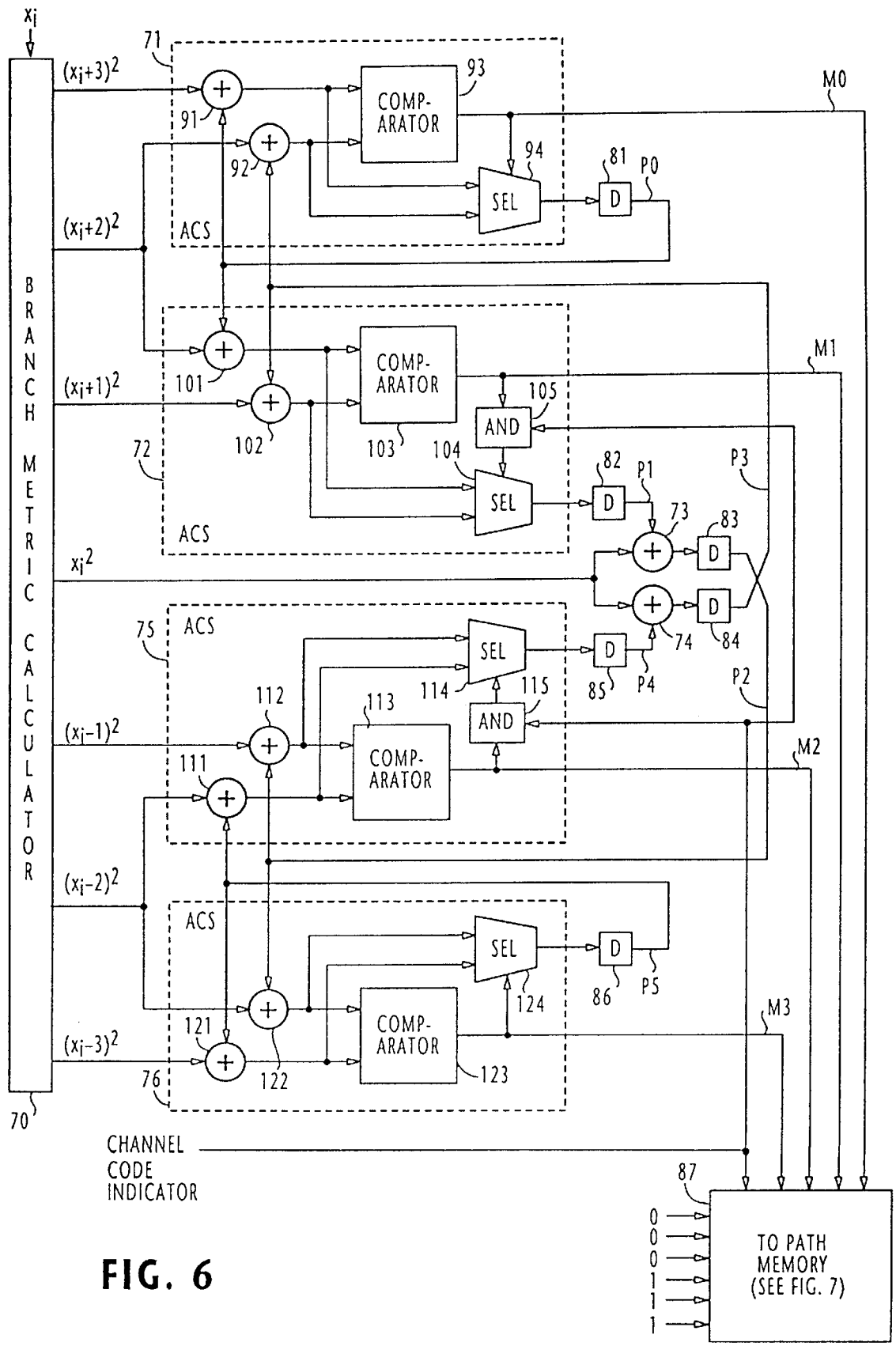
FIG. 6 is a block diagram of a PRML decoder according to a second embodiment of the present invention.

In FIG. 6, a branch metric calculator 70 produces first to seventh branch metrics $(x_i+3)^2$, $(x_i+2)^2$, $(x_i+1)^2$, $x_i^2$, $(x_i-1)^2$, $(x_i-2)^2$ and $(x_i-3)^2$ form the input bit sequence $x_i$.

ACS circuits 71 and 76, which are identical to the ACS circuits of FIG. 1, are provided, and ACS circuits 72 and 75, which are also identical to the ACS circuits of FIG. 1, but include an AND gate, are provided. The first and second branch metrics $(x_i+3)^2$ and $(x_i+2)^2$ are supplied to the ACS circuit 71 and the second and third branch metrics $(x_i+2)^2$ and $(x_i+1)^2$ are supplied to the ACS circuit 72. The fourth branch metric $x_i^2$ is applied to a pair of adders 73 and 74 in a manner similar to FIG. 1. The fifth and sixth branch metrics $(x_i-1)^2$ and $(x_i-2)^2$ are supplied to the ACS circuit 75 and the sixth and seventh branch metrics $(x_i-2)^2$ and $(x_i-3)^2$ are supplied to the ACS circuit 76.

The outputs of the ACS circuits 71, 72, the adders 73, 74 and the ACS circuits 75 and 76 are stored in unit delay circuits 81 to 86, respectively, producing path metrics P0 to P5.

The path metric P0 is fed back to adders 91 and 101 of the ACS circuits 71, 72 and the path metric P3 from the delay circuit 84 is fed back to adders 92 and 102. The path metrics P1 and P4 are summed with the branch metric $x_i^2$ in the adders 73 and 74. The path metric P5 is fed back to adders 111 and 121 of the ACS circuits 75, 76 and the path metric P2 from the delay circuit 83 is fed back to adders 112 and 122.

In the ACS circuit 71, the adders 91, 92 respectively combine the path metrics P0 and P3 with the branch metrics $(x_i+3)^2$ and $(x_i+2)^2$. The outputs of the adders 91, 92 are compared with each other in a comparator 93 and a smaller value of which is selected by a selector 94 to produce an updated path metric P0 at the output of delay circuit 81 during the next clock interval.

In the ACS circuit 72, the adders 101, 102 respectively combine the path metrics P0 and P3 with the branch metrics $(x_i+2)^2$ and $(x_i+1)^2$. The outputs of the adders 101 102 are compared with each other in a comparator 103 and a smaller value of which is selected by a selector 104. An AND gate 105 is connected between the output of comparator 103 and the control input of selector 104. This AND gate is enabled by the channel code indicator when the PRML decoder is processing a chard with a run-length limited by d=1 (i.e., seven-level six-state) and is disabled when the run-length limit of the processed channel is d=2 (i.e., five-level six-state). Therefore, when the AND gate 105 is enabled, the ACS circuit 72 operates normally, so that the selector 104 selects one of the outputs of adders 101, 102 whose path metric value is smaller and produces an updated path metric P1 at the output of delay circuit 82 during the next clock interval. Selector 104 is conditioned so that when the AND gate 105 is disabled, it passes the output of adder 101 to the delay circuit 82 to produce an updated branch metric P1 during the next clock internal. In this case, the branch metric $(x_i+1)^2$ is not reflected in the path metric P1. As a result, the ACS circuit 72 operates as an adder when the AND gate 105 is disabled.

In the ACS circuit 75, the adders 111, 112 respectively combine the path metrics P5 and P2 with the branch metrics $(x_i-2)^2$ and $(x_i-1)^2$. The outputs of the adders 111, 112 are compared with each other in a comparator 113 and a smaller value of which is selected by a selector 114. An AND gate 115 is connected between the output of comparator 113 and the control input of selector 114. Similar to the ACS circuit 72, the AND gate 115 is enabled by the channel code indicator when the processed channel has a run-length of d=1, and the selector 114 selects one of the outputs of adders 111, 112 whose path metric value is smaller and produces an updated path metric P4 which appears at the output of delay circuit 85 during the next clock interval. When the AND gate 115 is disabled, the selector 114 passes the output of adder 111 to the delay circuit 85 to produce an updated branch metric P4 which is used during the next clock interval. In this case, the ACS circuit 75 operates as an adder and the branch metric $(x_i-1)^2$ is not reflected in the path metric P4.

In the ACS circuit 76, the adders 121, 122 respectively combine the path metrics P5 and P2 with the branch metrics $(x_i-3)^2$ and $(x_i-2)^2$. The outputs of the adders 121, 122 are compared with each other in a comparator 123 and a smaller value of which is selected by a selector 124 to produce an updated path metric P5 at the output of delay circuit 85 during the next clock interval.

Figure 7:
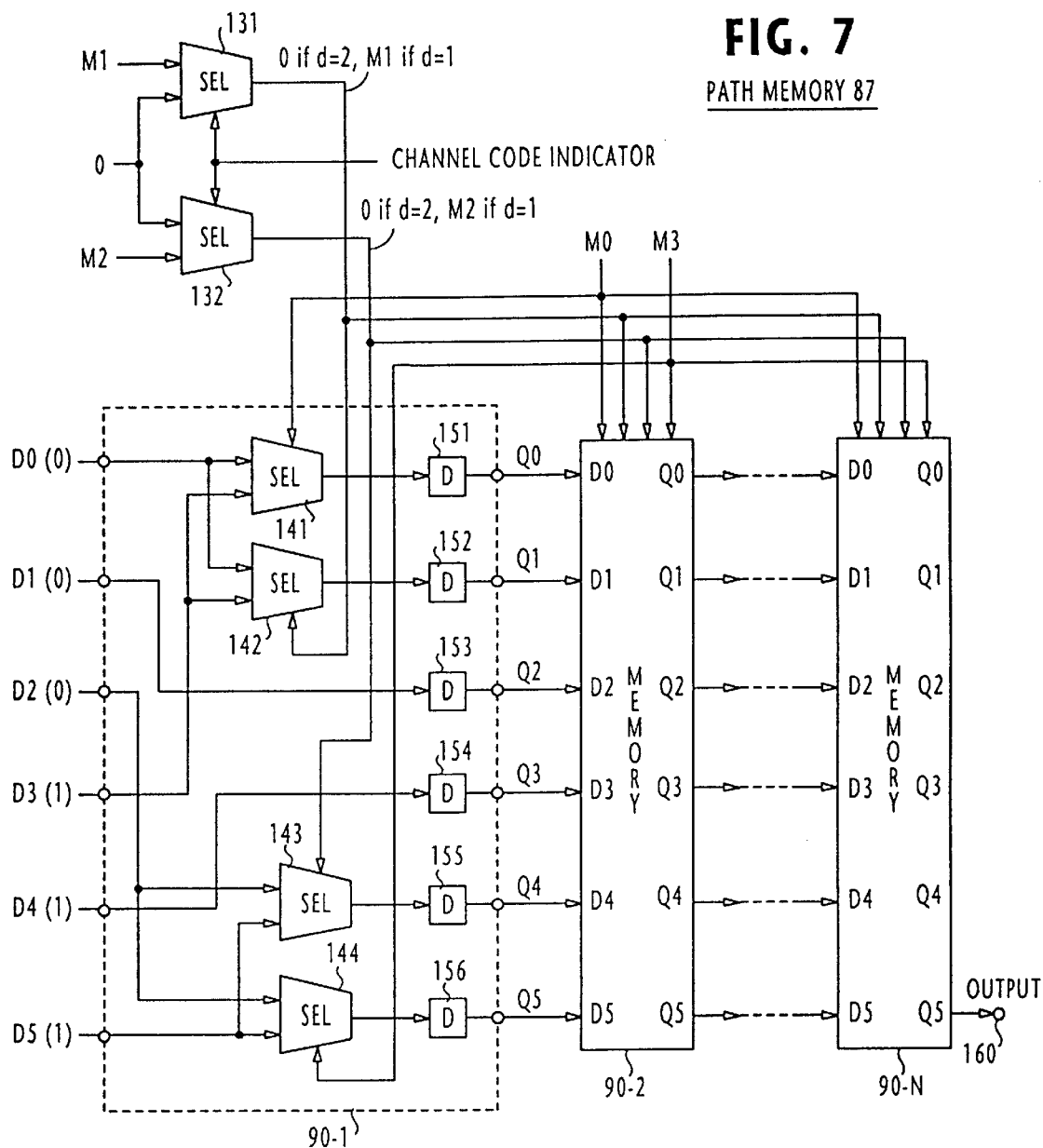
FIG. 7 is a block diagram of a path memory according to the second embodiment of this invention.

The channel code indicator and the outputs of comparators 93, 103, 113, 123 are supplied to a path memory 87 as path select signals M0 to M3. As illustrated in FIG. 7, the path memory 87 has a plurality of memories 90-1 to 90-N of identical construction connected in multiple stages. Selectors 131 and 132 are provided to receive the path select signals M1 and M2 from the ACS circuits 72 and 75. Selectors 131 and 132 are controlled by the channel code indicator to select a binary level "0" when the d=2 run-length limited channel is being processed. When the d=1 channel is being processed, on the other hand, the path select signals M1 and M2 are selected by the selectors 131, 132.

Each stage of memories 90 comprises selectors 141, 142, 143 and 144 which are respectively controlled by the path select signals M0, M1 (or 0), M2 (or 0) and M3. Unit delay circuits 151 to 156 are provided, with the delay circuits 151, 152, 155 and 156 being connected respectively to the outputs of selectors 141, 142, 143 and 144 to supply their outputs to output terminals Q0, Q1, Q4 and Q5. Delay circuits 153 and 154 provide binary levels "0" and "1", respectively, to output terminals Q2 and Q3.

When d=2, the selectors 142 and 143 are disabled by the by "0" outputs from the selectors 131 and 132, and the selectors 141 and 144 respond to the M0 and M3 path select signals for selecting one of binary level "0" or "1" at input terminals D0, D3, D2 and D5. In this case, no outputs are delivered from the delay units 152 and 155.

When d=1, the selectors 141 to 144 respond to the M0 to M3 path a select signals for selecting one of binary level "0" or "1" at input terminals D0, D3, D2 and D5. In this case, all the delay circuits produce their output signals.

The delay circuits 151 to 156 of each memory stage are clocked so that their contents are propagated from one stage to the next. The path memory 87 select a surviving path through a trellis diagram as a maximum likelihood bit sequence in accordance with the path select signals M0 and M3 when d=2 or M0 to M3 when d=1 and delivers the bit sequence through a terminal 160.

Figure 9:
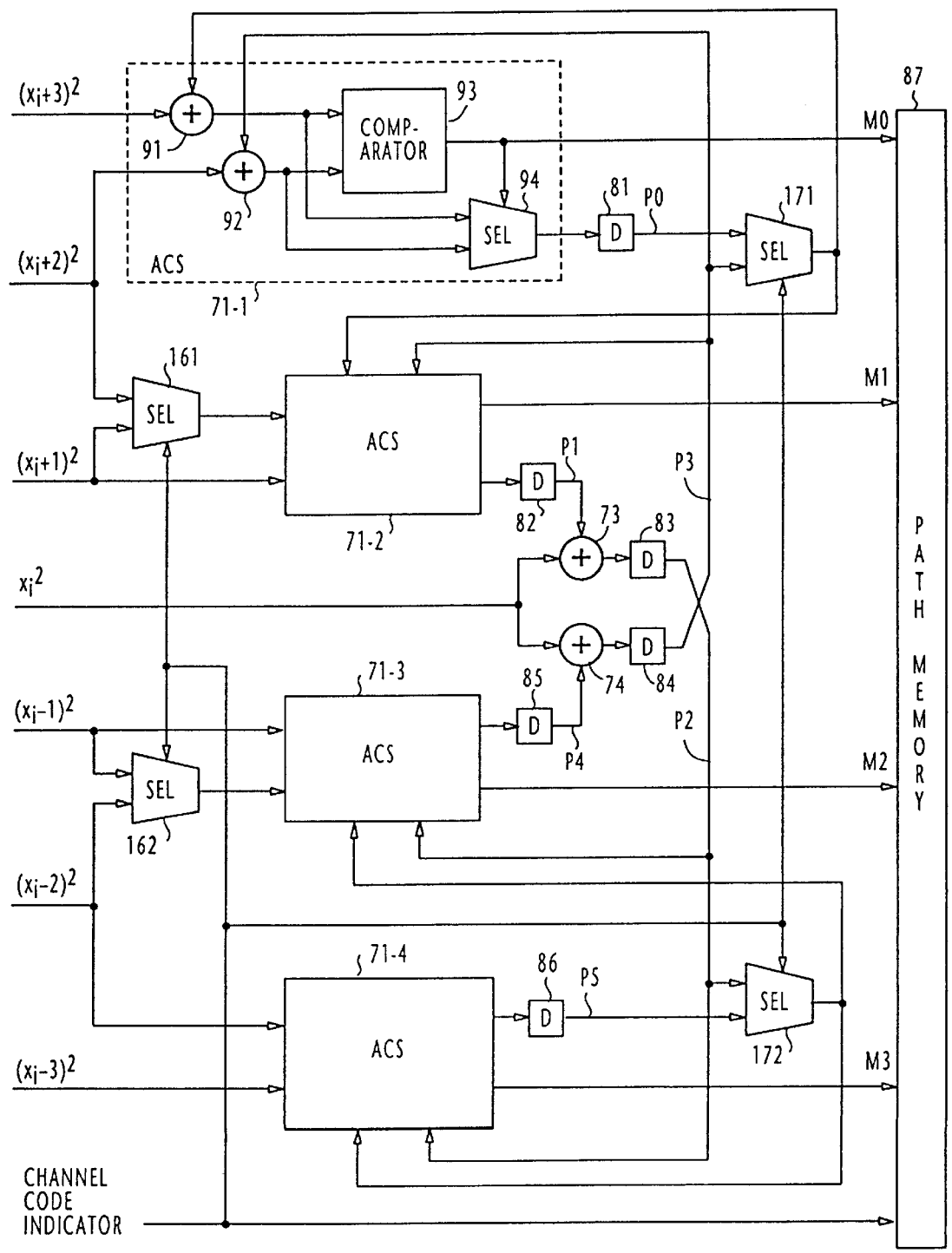
FIG. 9 is a block diagram of a modified PRML decoder of the second embodiment of the present invention.

The PRML decoder of FIG. 6 is modified as shown in FIG. 9. In this modification, ACS circuits 71-1, 71-2, 71-3 and 71-4 of identical construction ate used, and input selectors 161 and 162 and output selectors 171 and 172 are provided. All the selectors are controlled by the channel code indicator.

All the selectors are conditioned so that, when d=2 (i.e., five levels), the branch metrics $(x_i+1)^2$ and $(x_i-1)^2$ are selected by selectors 161 and 162 and supplied to the ACS circuits 71-2 and 71-3, respectively, and the path metrics P3 and P2 are respectively selected by the selectors 171 and 172. Path metric P3 is fed back to the ACS circuits 71-1 and 71-2, he path metric P2 being fed back to the ACS circuits 71-3 and 71-4.

Therefore, when d=2, the ACS circuit 71-1 is supplied with branch metrics $(x_i+3)^2$ and $(x_i+2)^2$ and path metric P3, the ACS circuit 71-2 is supplied with branch metric $(x_i+1)^2$ and path metric P3, the ACS circuit 71-3 with branch metric $(x_i-1)^2$ and path metric P2, and the ACS circuit 714 with branch metrics $(x_i-3)^2$ and $(x_1-2)^2$ and path metric P2. As a result, the adders of ACS circuits 71-2 and 71-3 produce same output signals and one of these signals is supplied to the associated delay circuits. Therefore, the path select signals MI and M2 are invalid when d=2.

When d=1 (i.e., seven levels), branch metrics $(x_i+2)^2$ and $(x_i-2)^2$ are selected by selectors 161 and 162 and supplied to the ACS circuits 71-2 and 71-3, respectively, and path metrics P0 and P5 are respectively selected by the selectors 171 and 172.

Therefore, when d=1, the ACS circuit 71-1 is supplied with the branch metrics $(x_i+3)^2$ and $(x_i+2)^2$ and the path metrics P0 and P3, the ACS circuit 71-2 is supplied with the branch metrics $(x_i+2)^2$ and $(x_i+1)^2$ and the path metrics P0 and P3, the ACS circuit 71-3 is supplied with the branch metrics $(x_i-2)^2$ and $(x_i-1)^2$ and the path metrics P5 and P2, and the ACS circuit 71-4 is supplied with the branch metrics $(x_i-3)^2$ and $(x_i-2)^2$ and the path metrics P5 and P2.

What is claimed is:

1. A partial response maximum likelihood decoder comprising:

branch metric calculator for receiving an input bit sequence having a multi-level multi-state characteristic precoded in a particular channel code and producing a set of branch metrics corresponding in number to amplitude levels which the input bit sequence assumes;

add/compare/select (ACS) circuitry including a plurality of ACS circuits, a plurality of adders and a plurality of unit delay elements connected respectively to the ACS circuits and the adders, the ACS circuitry being arranged to respond to a channel code indication indicating a type of said particular channel code such that, when said particular channel code is of a first type, the ACS circuits and the associated unit delay elements combine to produce a first path indication and most recent path metrics from the branch metrics and previous path metrics, and when said particular channel code is of a second type, the ACS circuits, the adders and the associated unit delay elements combine to produce a second path indication and most recent path metrics from the branch metrics and previous path metrics; and a path memory responsive to said first and second path indications and said channel code indication for producing an output bit sequence.

2. A partial response maximum likelihood decoder as claimed in claim 1, further comprising:

a comparator for comparing between path metrics supplied from said ACS circuitry and producing an output signal representing one of the path metrics having a smallest value; and a selector connected to output terminals of said path memory for selecting one of the output terminals according to the output signal of said comparator.

3. A partial response maximum likelihood decoder as claimed in claim 1, wherein the channel code of said first type is a code having no run length constraint and the channel code of said second type is a run length limited code.

4. A partial response maximum likelihood decoder as claimed in claim 1, wherein the channel code of said first type is a (1, 7) run-length limited code and the channel code of said second type is an EFM (eight-to-fourteen modulation) code.

5. A partial response maximum likelihood decoder comprising:

a branch metric calculator for receiving an input bit sequence having a multi-level multi-state characteristic precoded in a particular channel code and producing a set of branch metrics corresponding in number to amplitude levels which the input bit sequence assumes;

add/compare/select (ACS) circuitry including a plurality of ACS circuits, a plurality of adders and a plurality of unit delay elements connected respectively to the ACS circuits and the adders;

first selector circuitry for selectively coupling the branch metrics to said ACS circuitry according to a channel code indication indicating a type of said particular channel code and second selector circuitry for selectively feeding path metrics back to the ACS circuitry according to the channel code indication, so that when said particular channel code is of a first type, the ACS circuits and the associated unit delay elements combine to produce a first path indication and most recent path metrics from the branch metrics and previous path metrics, and when said particular channel code is of a second type, the ACS circuits, the adders and the associated unit delay elements combine to produce a second path indication and most recent path metrics from the branch metrics and previous path metrics; and a path memory responsive to said first and second path indications and said channel code indication for producing an output bit sequence.

6. A partial response maximum likelihood decoder as claimed in claim 5, further comprising:

a comparator for comparing between path metrics supplied from said ACS circuitry and producing an output signal representing one of the path metrics having a smallest value; and a selector connected to output terminals of said path memory for selecting one of the output terminals according to the output signal of said comparator.

7. A partial response maximum likelihood decoder as claimed in claim 5, wherein the channel code of said first type is a code having no run length constraint and the channel code of said second type is a run length limited code.

8. A partial response maximum likelihood decoder as claimed in claim 5, wherein the channel code of said first type is a (1, 7) run-length 3 limited code and the channel code of said second type is an EFM (eight-to-fourteen modulation) code.

9. A partial response maximum likelihood decoder comprising:

a branch metric calculator for receiving an input bit sequence having a multi-level multi-state characteristic precoded in a particular channel code and producing a set of branch metrics corresponding in number to amplitude levels which the input bit sequence assumes;

add/compare/select (ACS) circuitry including a plurality of ACS circuits, a plurality of adders and a plurality of unit delay elements connected respectively to the ACS circuits and the adders, said ACS circuitry being arranged to respond to a channel code indication indicating a type of said particular channel code such that, when said particular channel code is of a first type, ones of said ACS circuits perform normal ACS functions and remainder ones of the ACS circuits perform add functions, and the normal-functioning ACS circuits, the add-functioning ACS circuits, the adders and the associated unit delay elements combine to produce a first path indication and most recent path metrics from the branch metrics and previous path metrics, and when said particular channel code is of a second type, the ACS circuits, the adders and the associated unit delay elements combine to produce a second path indication and most recent path metrics from the branch metrics and previous path metrics; and a path memory responsive to said first and second path indications and said channel code indication for producing an output bit sequence.

10. A partial response maximum likelihood decoder as claimed in claim 9, further comprising:

a comparator for comparing between path metrics supplied from said ACS circuitry and producing an output signal representing one of the path metrics having a smallest value; and a selector connected to output terminals of said path memory for selecting one of the output terminals according to the output signal of said comparator.

11. A partial response maximum likelihood decoder as claimed in claim 9, wherein the channel code of said first type is a (1, 7) run-length limited code and the channel code of said second type is an EFM (eight-to-fourteen modulation) code.

12. A playback system comprising:

means for recovering an input bit sequence from a recording disc in which the bit sequence is recorded in a particular channel code so that the bit sequence has a multi-level multi-state characteristic and recovering a channel code indication indicating a type of said particular channel code;

a branch metric calculator for receiving said input bit sequence and producing a set of branch metrics corresponding in number to amplitude levels which the input bit sequence assumes;

add/compare/select (ACS) circuitry including a plurality of ACS circuits, a plurality of adders and a plurality of unit delay elements connected respectively to the ACS circuits and the adders, the ACS circuitry being arranged to respond to a channel code indication indicating a type of said particular channel code such that, when said particular channel code is of a first type, the ACS circuits and the associated unit delay elements combine to produce a first path indication and most recent path metrics from the branch metrics and previous path metrics, and when said particular channel code is of a second type, the ACS circuits, the adders and the associated unit delay elements combine to produce a second path indication and most recent path metrics from the branch metrics and previous path metrics; and a path memory responsive to said first and second path indications and said channel code indication for producing an output bit sequence.

13. A playback system as claimed in claim 12, further comprising:

a comparator for comparing between path metrics supplied from said ACS circuitry and producing an output signal representing one of the path metrics having a smallest value; and a selector connected to output terminals of said path memory for selecting one of the output terminals according to the output signal of said comparator.

14. A playback system as claimed in claim 12, wherein the channel code of said first type is a code having no run length constraint and the channel code of said second type is a run length limited code.

15. A playback system as claimed in claim 12, wherein the channel code of said first type is a (1, 7) run-length limited code and the channel code of said second type is an EFM (eight-to-fourteen modulation) code.

16. A playback system comprising:

means for recovering an input bit sequence from a recording disc in which the bit sequence is recorded in a particular channel code so that the bit sequence has a multi-level multi-state characteristic and recovering a channel code indication indicating a type of said particular channel code;

a branch metric calculator for receiving said input bit sequence and producing a set of branch metrics corresponding in number to amplitude levels which the input bit sequence assumes;

add/compare/select (ACS) circuitry including a plurality of ACS circuits, a plurality of adders and a plurality of unit delay elements connected respectively to the ACS circuits and the adders;

first selector circuitry for selectively coupling the branch metrics to aid ACS circuitry according to a channel code indication indicating a type of said particular channel code and second selector circuitry for selectively feeding path metrics back to the ACS circuitry according to the channel code indication, so that when said particular channel code is of a first type, the ACS circuits and the associated unit delay elements combine to produce a first path indication and most recent path metrics from the branch metrics and previous path metrics, and when said particular channel code is of a second type, the ACS circuits, the adders and the associated unit delay elements combine to produce a second path indication and most recent path metrics from the branch metrics and previous path metrics; and a path memory responsive to said first and second path indications and said channel code indication for producing an output bit sequence.

17. A playback system as claimed in claim 16, further comprising:

a comparator for comparing between path metrics supplied from said ACS circuitry and producing an output signal representing one of the path metrics having a smallest value; and a selector connected to output terminals of said path memory for selecting one of the output terminals according to the output signal of said comparator.

18. A playback system as claimed in claim 16, wherein the channel code of said first type is a code having no run length constraint and the channel code of said second type is a run length limited code.

19. A playback system as claimed in claim 16, wherein the channel code of said first type is a (1, 7) run-length limited code and the channel code of said second type is an EFM (eight-to-fourteen modulation) code.

20. A playback system comprising:

means for recovering an input bit sequence from a recording disc in which the bit sequence is recorded in a particular channel code so that the bit sequence has a multi-level multi-state characteristic and recovering a channel code indication indicating a type of said particular channel code;

a branch metric calculator for receiving said input bit sequence and producing a set of branch metrics corresponding in number to amplitude levels which the input bit sequence assumes;

add/compare/select (ACS) circuitry including a plurality of ACS circuits, a plurality of adders and a plurality of unit delay elements connected respectively to the ACS circuits and the adders, said ACS circuitry being arranged to respond to a channel code indication indicating a type of said particular channel code such that, when said particular channel code is of a first type, ones of said ACS circuits perform normal ACS functions and remainder ones of the ACS circuits perform add functions, and the normal-functioning ACS circuits, the add-functioning ACS circuits, the adders and the associated unit delay elements combine to produce a first path indication and most recent path metrics from the branch metrics and previous path metrics, and when said particular channel code is of a second type, the ACS circuits, the adders and the associated unit delay elements combine to produce a second path indication and most recent path metrics from the branch metrics and previous path metrics; and a path memory responsive to said first and second path indications and said channel code indication for producing an output bit sequence.

21. A playback system as claimed in claim 20, further comprising:

a comparator for comparing between path metrics supplied from said ACS circuitry and producing an output signal representing one of the path metrics having a smallest value; and a selector connected to output terminals of said path memory for selecting one of the output terminals according to the output signal of said comparator.

22. A playback system as claimed in claim 20, wherein the channel code of said first type is a (1, 7) run-length limited code and the channel code of said second type is an EFM (eight-to-fourteen modulation) code.

* * * * *